D. VANDEWATER.
GRINDING ATTACHMENT FOR LATHES.
APPLICATION FILED APR. 12, 1915.
1,268,186.
Patented June 4, 1918.
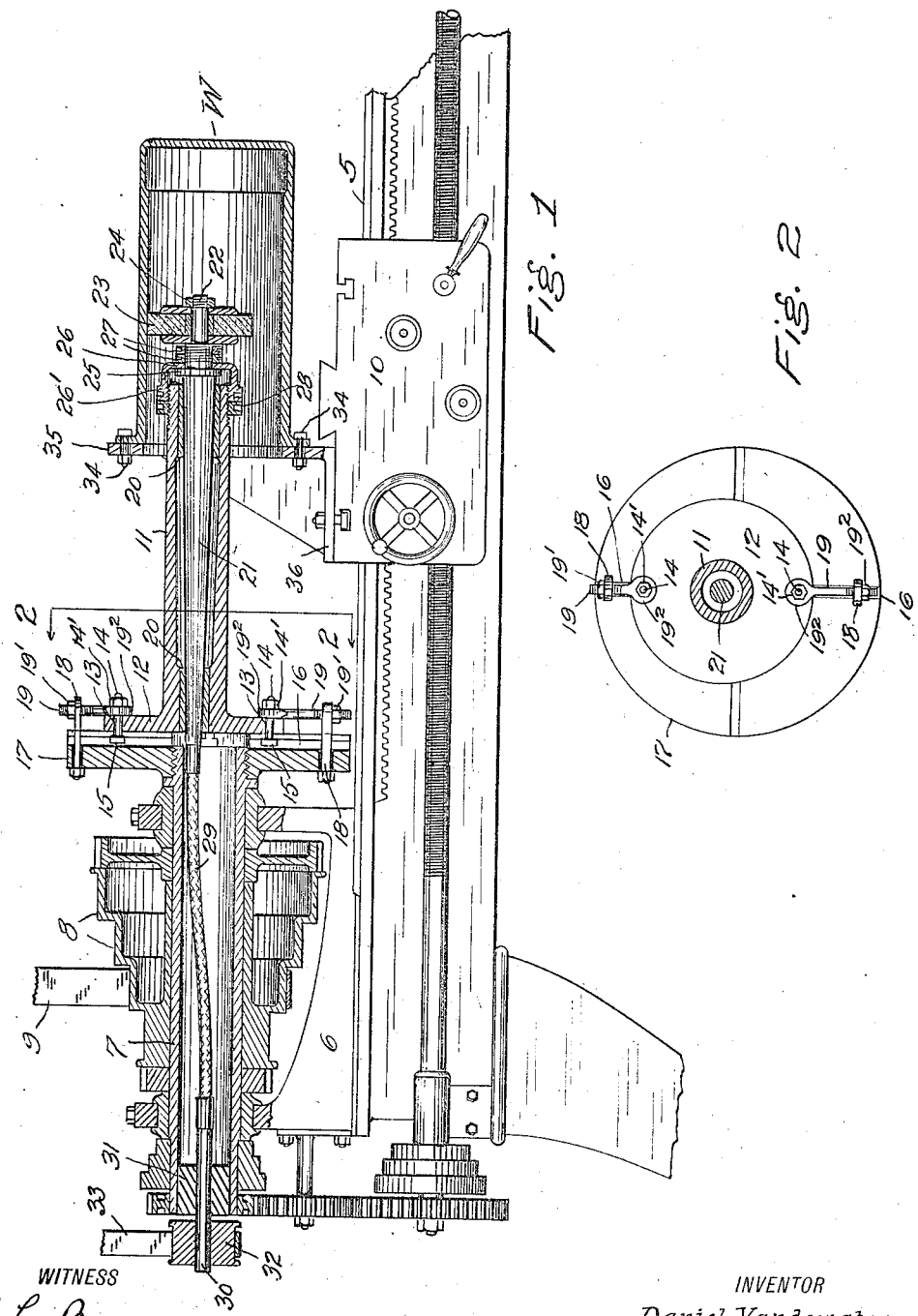
WITNESS
A. L. Bowen.
INVENTOR
Daniel Vandewater
BY
Pierre Barnes
ATTORNEY

UNITED STATES PATENT OFFICE.

DANIEL VANDEWATER, OF RIVERTON, WASHINGTON.

GRINDING ATTACHMENT FOR LATHES.

1,268,186.  Specification of Letters Patent.  Patented June 4, 1918.

Application filed April 12, 1915. Serial No. 20,663.

*To all whom it may concern:*

Be it known that I, DANIEL VANDEWATER, a citizen of the United States, residing at Riverton, in the county of King and State of Washington, have invented certain new and useful Improvements in Grinding Attachments for Lathes of which the following is a specification.

This invention relates to grinding attachments for lathes of the class which is illustrated and described in my application, Serial No. 7,950, filed in the United States Patent Office February 13, 1915.

The object of the present invention is to improve and simplify the construction, and render the grinder more generally useful.

The invention comprises a hollow mandrel adapted to be secured in eccentric position upon the face-plate of a lathe, a shaft element journaled therein, an abrasive wheel or cutter secured to the outer end of such shaft element, and a flexible shaft element extending through the lathe head-stock and connected to a shaft element upon which is mounted a power driven wheel or belt pulley.

The invention further consists in the novel construction, arrangement and combination of details, as will be hereinafter described and claimed.

In the accompanying drawings, Figure 1 is a fragmentary view of a lathe, shown partly in front elevation and partly in longitudinal vertical section with my improved devices applied thereto. Fig. 2 is a sectional view taken through 2—2 of Fig. 1.

The reference numeral 5 represents the lathe bed and 6 is the frame of the headstock provided with journal bearings for the usual tubular live spindle 7 upon which are cone pulleys 8 for a driving belt 9.

10 represents a carriage movable longitudinally on the lathe-bed 5 by the usual feeding mechanism of the lathe.

According to this invention, I provide a tubular support or mandrel 11 having at one end a flange 12 which is apertured, as at 13, to receive bolts 14 having T-shaped heads 15, which engage in corresponding shaped grooves 16 provided in the face-plate 17. 18 represent posts rigidly secured to said face-plate and extending through the posts are screw-threaded ends of adjustment bolts 19 having, in turn, apertured heads $19^2$ through which extend the bolts 14.

$19^1$ represent nuts engaging the bolts 19 whereby the eccentricity of the mandrel 11 is regulated, and $14^1$ are nuts engaging the bolts 14 for securing the mandrel in adjusted position.

Extending axially through said mandrel and journaled in bearings 20 provided therein is a tapered arbor 21 with a stud 22 at its outer end upon which is secured an emery wheel 23 by a nut 24.

25 represents a collar provided on said arbor to abut against an inwardly directed peripheral flange 26 of a nut $26^1$, said nut engaging screw-threads formed on the mandrel. Complementary nuts 27 engage a screw-thread formed on the arbor and are adjusted to afford, with the collar 25, an annular recess to accommodate the flange of nut $26^1$. By screwing the latter upon the mandrel, said shaft is caused to move axially to compensate for any wear ensuing in the journal bearings 20.

28 is a jam-nut for locking the nut $26^1$ in adjusted positions.

Secured to the inner end of the arbor 21 is a flexible shaft-member 29, to the other end of which is secured a stub or shaft-member 30 journaled in a bushing 31 which is inserted within the outer end of the spindle 7. The stub shaft 30 protrudes beyond said spindle to receive a pulley 32 for a power-driven belt 33.

The arbor 21, the member 29 and the stub 30 constitute, in effect, a single shaft with respect to transmitting rotary motion to the grinding wheel 23.

The shaft members 30 and 21 are respectively arranged to extend axially through the spindle and the mandrel and any offsetting of the axis of the latter with respect to the spindle 7 is compensated for by the flexibility of the flexible member 29.

The work W, representing in the drawing a cylinder which is to be internally ground, is secured in axial alinement with the spindle 7 by means of bolts 34 to the vertical member 35 of an angle plate whose horizontal member 36 is secured to the carriage 10.

The operation of the invention may be described as follows:

With the cylinder or work W properly secured to the angle-plate, as above described, the operator regulates the eccentricity of the mandrel and the grinding wheel through the medium of the bolts and nuts 19 and $19^1$, whereupon the mandrel is secured to the face-plate through the instrumentality of the bolts and nuts 14 and 14¹.

The driving belts 9 and 33 are then caused to become operative, resulting in the rotation at appropriate speeds of the face-plate 17 and the grinding wheel 23. Inasmuch as the axis of the mandrel which carries the shaft 21, upon which the wheel 23 is mounted, is secured in eccentric relations to the axis of the face-plate, the rotation of the latter will impart a revoluble movement to the wheel, whereby it is carried clear around the inner periphery of the work to enable it to effect a grinding or abrasive action thereupon.

What I claim is—

In a device of the class described, the combination with the head-stock spindle, of a hollow mandrel adapted to be revolubly carried by said spindle, means to regulate the position of the mandrel radially of said spindle, a shaft extending through the spindle and the mandrel, said shaft comprising a stub element rotatable in a bearing provided in the spindle, an arbor element rotatable in the mandrel, and an intermediate flexible element, an abrasive wheel mounted on the shaft arbor element, means to rotate the shaft from its stub element, and means to drive the spindle to revolubly carry the wheel while the same is rotating about the axis thereof.

Signed at Seattle, Washington, this 27th day of March, 1915.

DANIEL VANDEWATER.

Witnesses:
PIERRE BARNES,
CHRIST JENSEN.